(12) United States Patent
Chen

(10) Patent No.: US 8,038,291 B2
(45) Date of Patent: Oct. 18, 2011

(54) GLASSES AND GLASSES BOX

(76) Inventor: Tsung-Wen Chen, Taipei (TW)

( * ) Notice: Subject to any disclaimer, the term of this patent is extended or adjusted under 35 U.S.C. 154(b) by 0 days.

(21) Appl. No.: 12/563,100

(22) Filed: Sep. 18, 2009

(65) Prior Publication Data

US 2010/0225878 A1  Sep. 9, 2010

(30) Foreign Application Priority Data

Mar. 6, 2009 (CN) .................. 2009 20 137039.2

(51) Int. Cl.
*G02C 5/08* (2006.01)
(52) U.S. Cl. .......................................... 351/63; 351/121
(58) Field of Classification Search .................. 351/41, 351/63, 111–123, 153; 16/228
See application file for complete search history.

(56) References Cited

U.S. PATENT DOCUMENTS 6,848,787 B2 * 2/2005 Dietz ............................ 351/112

2004/0183993 A1 * 9/2004 Dietz ............................. 351/41

* cited by examiner

*Primary Examiner* — Huy K Mai

(57) ABSTRACT

The present invention discloses glasses. The glasses include a pair of temples and a frame which is integrally formed with the temples. An inner side of the junction of each of the temples and the frame is formed with a corrugated surface. The temples are provided with magnetic members in relative positions. The magnetic members engage with each other to secure the temples in place when the temples are folded. The glasses may be attracted on a metallic board or a metallic frame for convenient storage and use. The present invention discloses a glasses box which includes a box body and a box cover. The box body and the box cover are buckled together to form an accommodating space for receiving glasses. The box cover has an outer side provided with a sucker and an inner side provided with a magnet. When in use, the glasses box provides an accommodating space for receiving glasses therein. When taking out the glasses, the sucker of the box cover could be secured on a desired place. The glasses when not in use could be attracted on the magnet. This is very convenient for specific glasses which have temples made of metallic material or magnetic members.

5 Claims, 10 Drawing Sheets

GLASSES AND GLASSES BOX

BACKGROUND OF THE INVENTION

1. Field of the Invention

The present invention relates to glasses and a glasses box.

2. Description of the Prior Art

As shown in FIG. 1, conventional glasses comprise a pair of temples 10 and a frame 20. There is no hinge between the temples 10 and the frame 20. The temples 10 are unfolded normally. As to the glasses made of resin material, for bending the temples with ease, an inner side of the junction of each temple 10 and the frame 20 is formed with a corrugated surface 30 to enhance the extensibility of the material so that the temples can be folded smoothly by applying force. The folded temples are bound together with a belt 40 so as to reduce the size of the glasses, as shown in FIG. 2. As to the glasses made of metallic material, it is not necessary to have a corrugation design. The temples can be folded directly by applying force. With a belt, the temples are bound together to reduce the size of the glasses. However, no matter what material and what shape of the glasses, it is required to use the belt for binding. This is inconvenient for storage.

In addition, a conventional glasses box is used to receive glasses. When the glasses are not in use, the glasses are folded and stored in the glasses box, preventing the glasses from being stained or broken. When needing the glasses, the glasses are opened to take out the glasses. This manner is inconvenient, particularly, to the users of reading glasses. They don't wear the glasses all the time. Sometimes, the user puts the glasses without concern, and can't find the glasses later. Probably, the glasses are stained or damaged. The glasses box doesn't provide a protection function. Even though the user puts the glasses into the glasses box, he/she may put the glasses box without concern and then can't find the glasses occasionally.

Accordingly, the inventor of the present invention has devoted himself based on his many years of practical experiences to solve this problem.

SUMMARY OF THE INVENTION

The primary object of the present invention is to provide glasses, which is conventional for storage.

Another object of the present invention is to provide a glasses box, which is conventional for storage and use of glasses.

According to a first aspect of the present invention, there is provided glasses, comprising a pair of temples and a frame which is integrally formed with the temples, an inner side of the junction of each of the temples and the frame being formed with a corrugated surface, the temples being provided with magnetic members in relative positions, the magnetic members engaging with each other to secure the temples in place when the temples are folded.

Preferably, the magnetic members are a magnet and a metallic member, one of the temples being provided with the magnet and the other of the temples being provided with the metallic member corresponding in position to the magnet, the magnet and the metallic member engaging with each other to secure the temples in place when the temples are folded.

Preferably, the magnetic members are magnets which are mounted in the temples in relative positions, the magnets engaging with each other to secure the temples in place when the temples are folded.

Preferably, the glasses are made of resin material and the magnetic members are wrapped in the temples.

Preferably, the glasses are made of metallic material and the temples are respectively formed with a cavity corresponding in position to each other for receiving the magnetic members therein.

The magnetic members of the temples are attracted each other for locating the temples in place when the temples are folded, without using a belt for binding the temples. With the magnetic members, the glasses of the present invention could be attached to a metallic board or a metallic frame. This is convenient for storage and use.

According to a second aspect of the present invention, there is provided a glasses box, comprising a box body and a box cover, the box body and the box cover being buckled together to form an accommodating space for receiving glasses, the box cover having an outer side provided with a sucker and an inner side provided with a magnet.

Preferably, the inner side of the box cover is formed with a first locating trough for mounting the magnet and the outer side of the box cover is formed with a second locating trough for mounting the sucker, each of the first locating trough and the second locating trough having a bottom and an opening which is smaller than the bottom, the sucker having a top formed with a neck and a locating head, the locating head being attached to the bottom of the second locating trough and the neck being inserted in the second locating trough for the sucker being secured on the box cover, the magnet having a locating flange, the magnet being placed in the first locating trough with the locating flange engaging with the bottom of the first locating trough for the magnet being secured on the box cover.

Preferably, the box cover is provided with two suckers mounted on the outer side of the box cover.

Preferably, the magnet of the box cover is mounted on a central portion of the inner side of the box cover.

Preferably, the magnet has an end surface flush with the box cover or higher than the box cover.

Preferably, the box cover is composed of a left semi-cover and a right semi-cover, the left semi-cover and the right semi-cover being provided with insertion holes and insertion posts, respectively, for coupling the left semi-cover and the right semi-cover together.

Preferably, the first locating trough and the second locating trough are divided into two parts, respectively, formed on the left semi-cover and the right semi-cover.

Preferably, the box cover is formed with a projection at a central portion thereof and a flange around a periphery thereof.

The glasses box of the present invention uses the box body and the box cover to provide an accommodating space for receiving glasses therein. Both sides of the box cover are provided with the sucker and the magnet, respectively. When taking off the glasses, the sucker of the box cover is secured on a desired place. The glasses when not in use could be attracted on the magnet. This is very convenient for specific glasses which have temples made of metallic material or magnetic members (magnets), such as the glasses of the present invention. The present invention can help the user to find the glasses easily, without worrying about the glasses to be stained or damaged.

DETAILED DESCRIPTION OF THE PREFERRED EMBODIMENTS

Embodiments of the present invention will now be described, by way of example only, with reference to the accompanying drawings.

Figure 1:
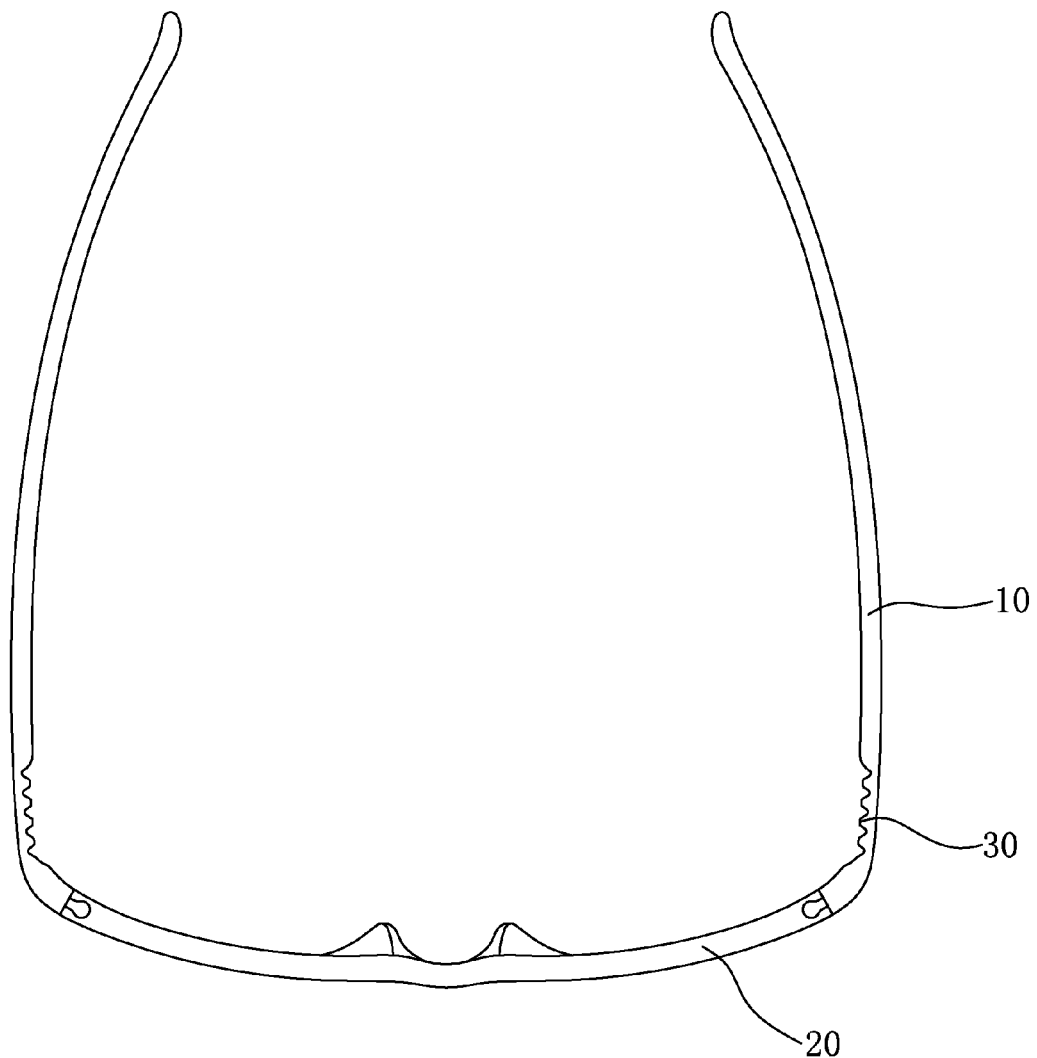
FIG. 1 is a top view of conventional glasses in an unfolded status.
Figure 2:
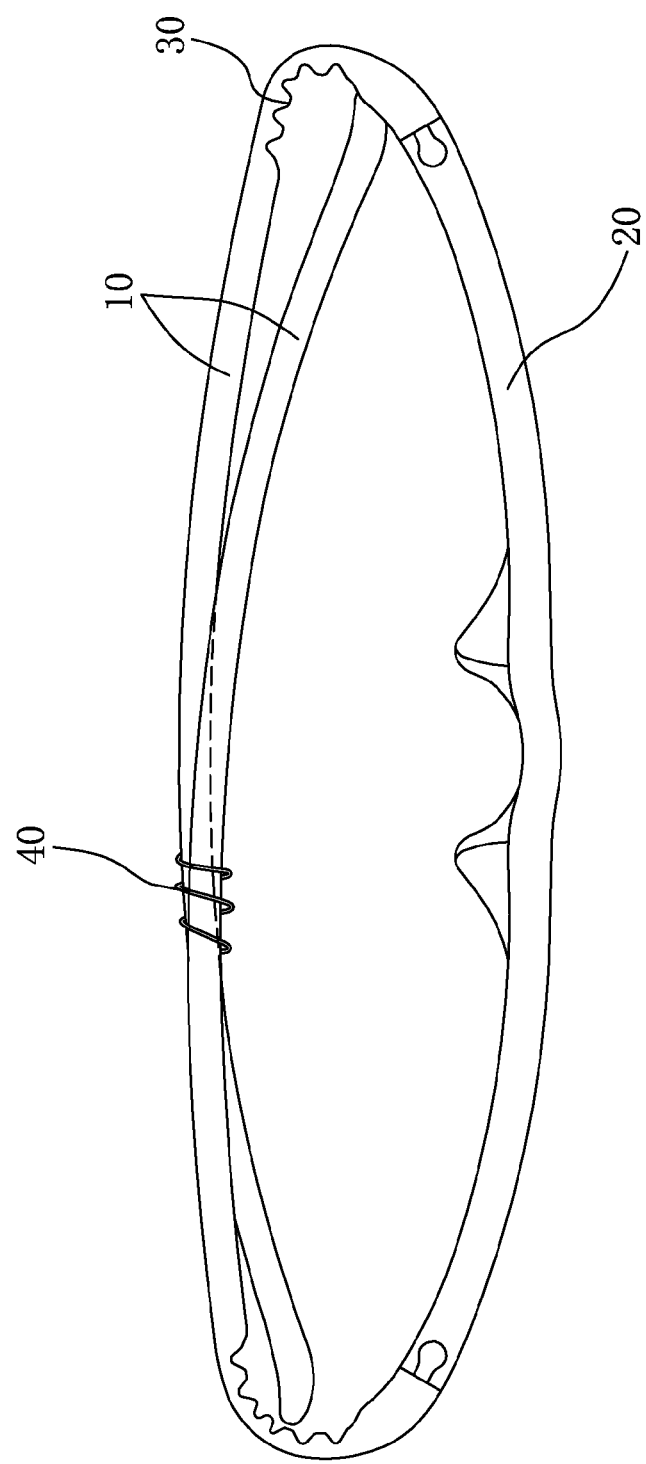
FIG. 2 is a schematic view of the conventional glasses in a folded status.
Figure 3:
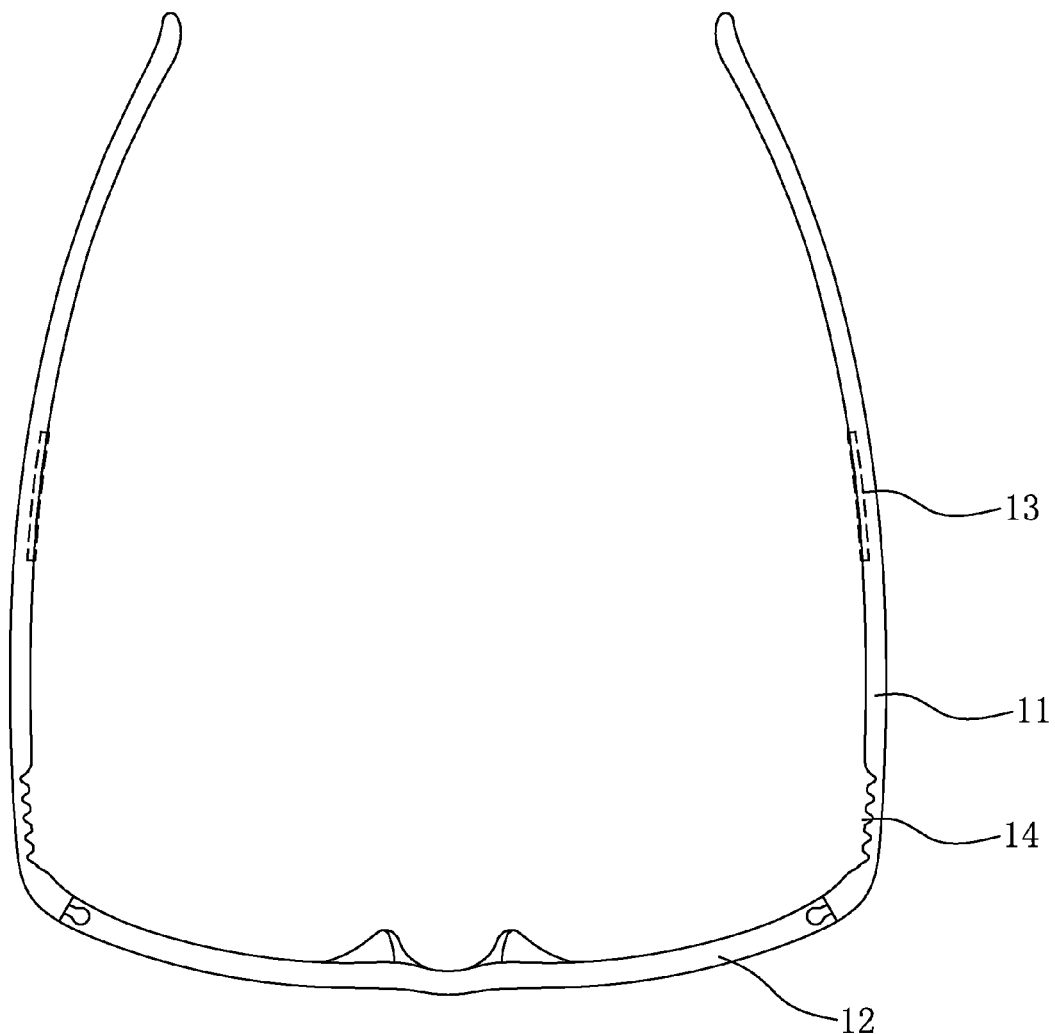
FIG. 3 is a top view of glasses of the present invention.
Figure 4:
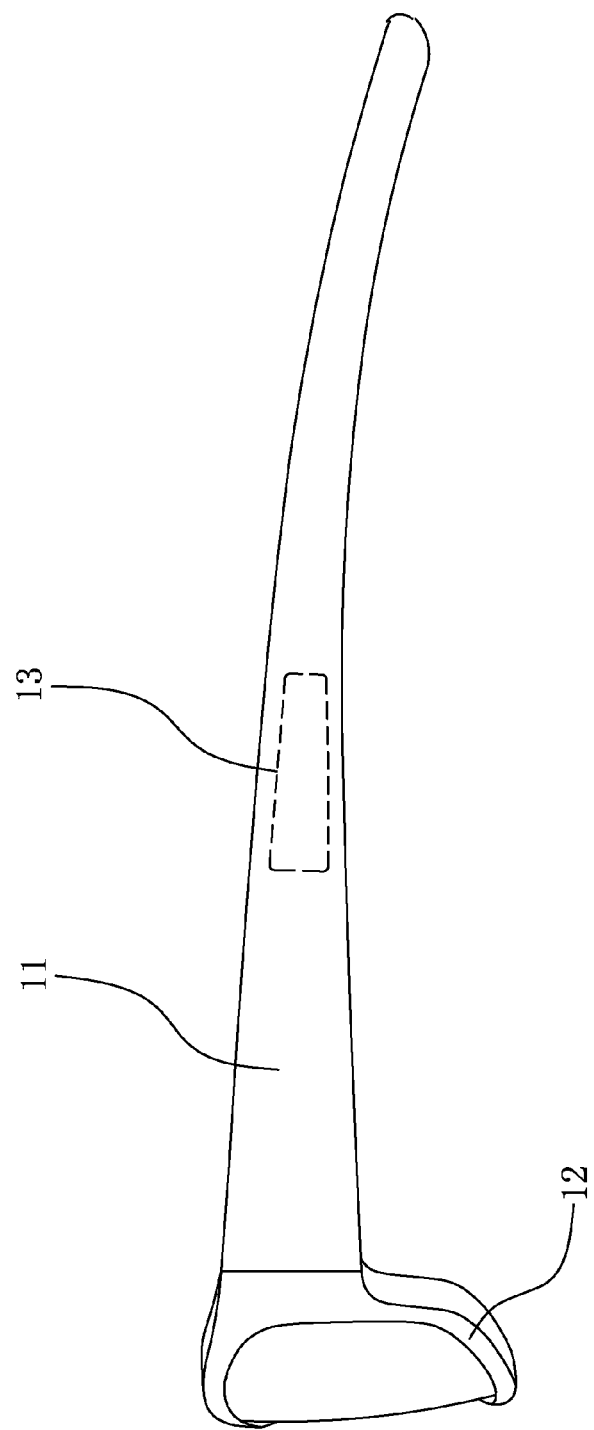
FIG. 4 is a side view of the glasses of the present invention.

As shown in FIGS. 3 and 4, a pair of glasses according to a preferred embodiment of the present invention comprises a pair of temples 11 and a frame 12 which is integrally formed with the temples 11. An inner side of the junction of each temple 11 and the frame 12 is formed with a corrugated surface 14. The two temples 11 are provided with magnetic members 13 in relative positions. The magnetic members 13 may be magnets, magnetized metallic members, metallic members which can be attracted by a magnet, or the like. For example, one temple 11 is provided with a magnet, the other temple 11 is provided with a metallic member in a relative position. Alternatively, both the temples 11 are provided with magnets in relative positions. As to the glasses made of resin material as shown in FIGS. 3 and 4, the magnetic members 13 are direct wrapped in the temples 11 before the temples 11 are shaped. As to the glasses made of metallic material, the two temples 11 are respectively formed with a cavity corresponding in position to each other. After the temples 11 are formed, the magnetic members 13 are respectively mounted in the cavity.

Figure 5:
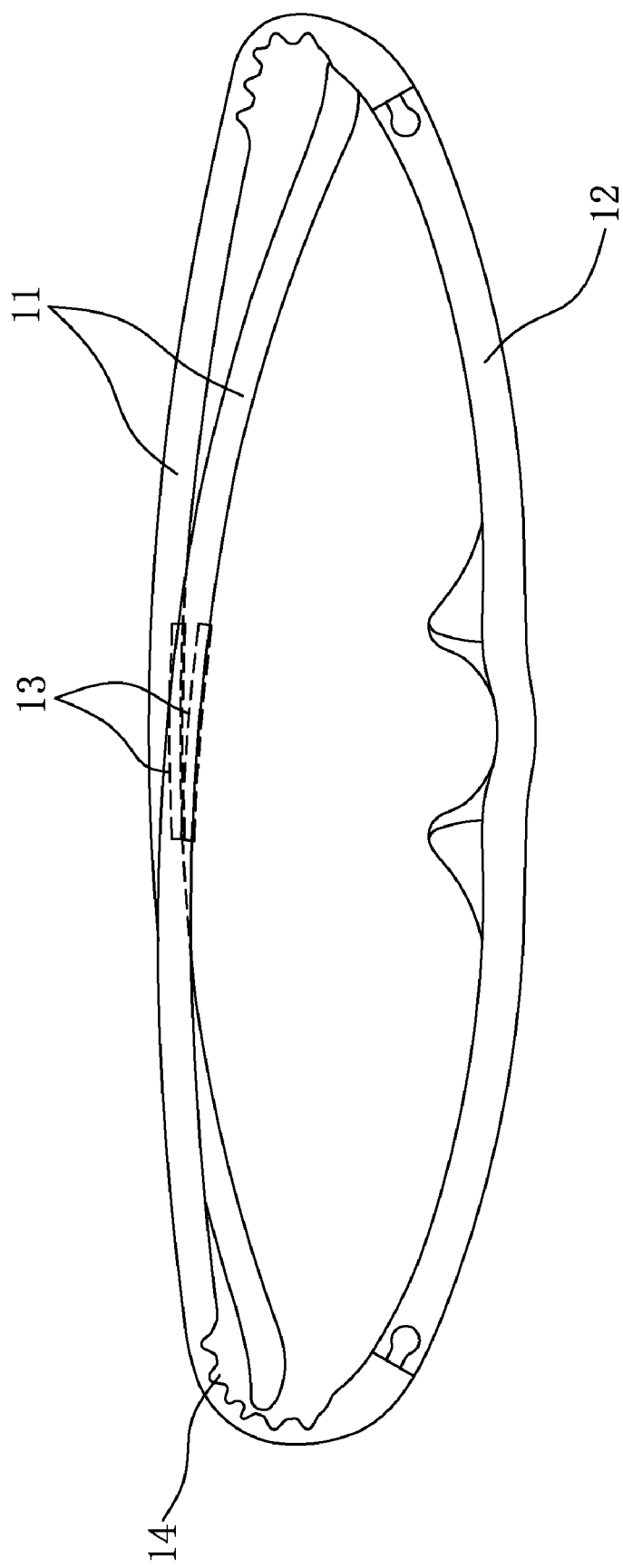
FIG. 5 is a schematic view of the glasses of the present invention in a folded status.

FIG. 5 shows that the glasses are collapsed. When the two temples 11 are folded, the magnetic members 13 in the two temples 11 will engage with each other so that the two temples are secured in place. It is not required to use a belt for binding the temples 11.

Figure 6:
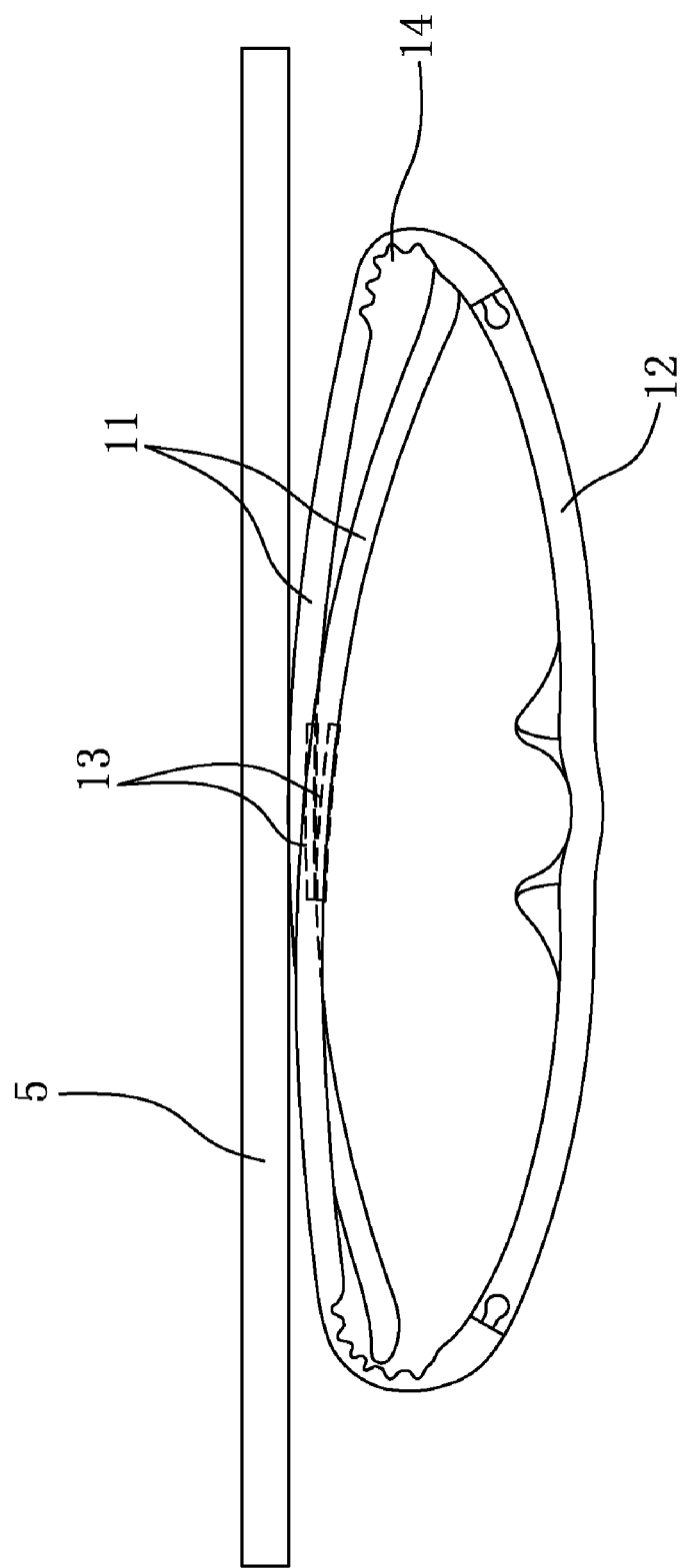
FIG. 6 is a schematic view of the glasses of the present invention attracted to a metallic frame.
Figure 7:
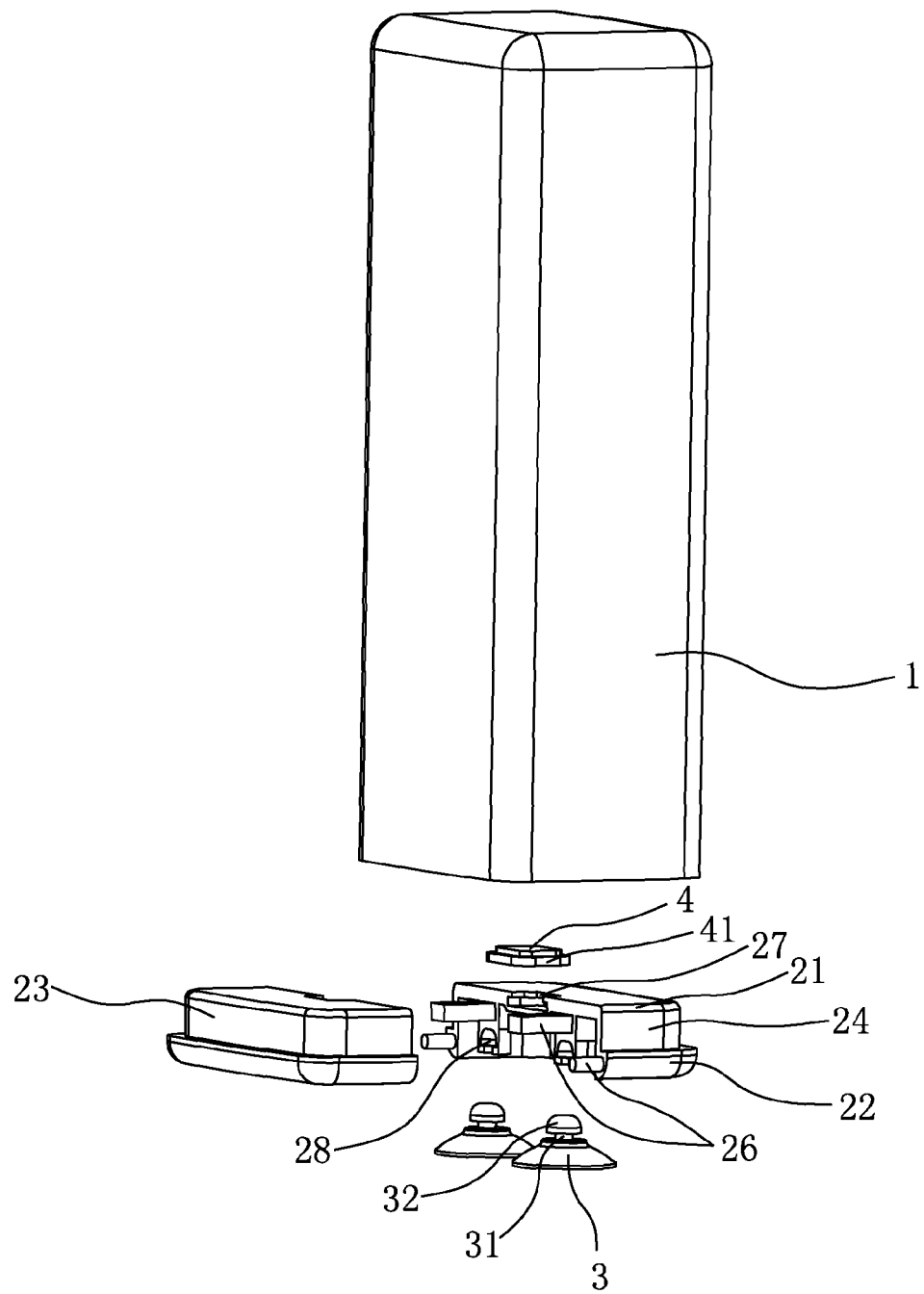
FIG. 7 is an exploded view of a glasses box of the present invention.
Figure 8:
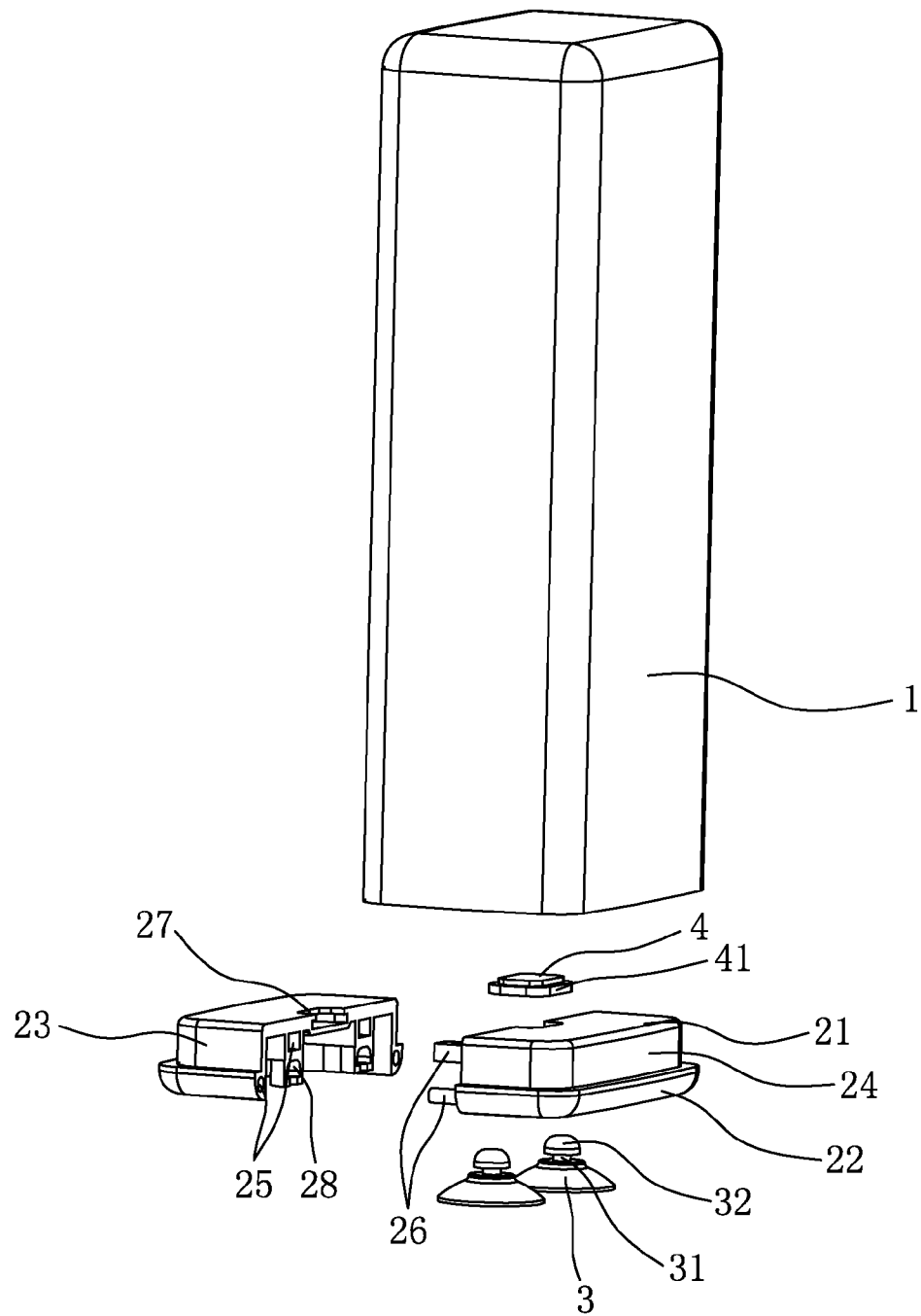
FIG. 8 is another exploded view of the glasses box of the present invention.

Referring to FIG. 6, with the magnetic members 13, the glasses of the present invention could be attached to a metallic board or a metallic frame 5. Particularly, spare reading glasses in a public place, such as a bank, can adopt the magnetic members 13 of the present invention to be attracted on a metallic board or a metallic frame. This is convenient for storage and use.

The feature of the present invention is that the temples 11 are provided with the magnetic members 13 which are attracted each other for locating the temples 11 in place when the temples 11 are folded. The present invention can be applied to reading glasses, myopia glasses, sunglasses and so on, in particular to the glasses which don't have a hinge and are in an unfolding status normally or other glasses which need locating the temples when putting away the glasses.

As shown in FIGS. 7 to 10, a glasses box according to a preferred embodiment of the present invention comprises a box body 1 and a box cover 2. The box body 1 and the box cover 2 are buckled together to form an accommodating space for receiving glasses. For buckling the box body 1 and the box cover 2 securely, the box cover 2 is formed with a projection 21 at a central portion thereof and a flange 22 around a periphery thereof. The projection 21 is adapted to engage with an inner wall of the box body 1 and the to flange 22 is adapted to block an opening of the box body 1 so that the box body 1 and the box cover 2 are buckled together.

The box cover 2 has an outer side provided with a sucker 3 and an inner side provided with a magnet 4. In this embodiment, the inner side of the box cover 2 is formed with a first locating trough 27 for mounting the magnet 4, and the outer side of the box cover 2 is formed with a second locating trough 28 for mounting the sucker 3. Each of the first locating trough 27 and the second locating trough 28 has a bottom and an opening which is smaller than the bottom. In order to provide a convenient installation, the box cover 2 is composed of a left semi-cover 23 and a right semi-cover 24. The left semi-cover 23 and the right semi-cover 24 are provided with insertion holes 25 and insertion posts 26, respectively, for coupling the left semi-cover 23 and the right semi-cover 24 together to form the integrated box cover 2. The first locating trough 27 and the second locating trough 28 are divided into two parts, respectively, formed on the left semi-cover 23 and the right semi-cover 24. When the left semi-cover 23 and the right semi-cover 24 are coupled together, the first locating trough 27 and the second locating trough 28 are constituted.

The sucker 3 has a top formed with a neck 31 and a locating head 32. The locating head 32 is attached to the bottom of the second locating trough 28 and the neck 31 is inserted in the second locating trough 28 such that the sucker 3 is secured on the box cover 2. In the embodiment, there are two suckers 3 on the box cover 2.

Figure 9:
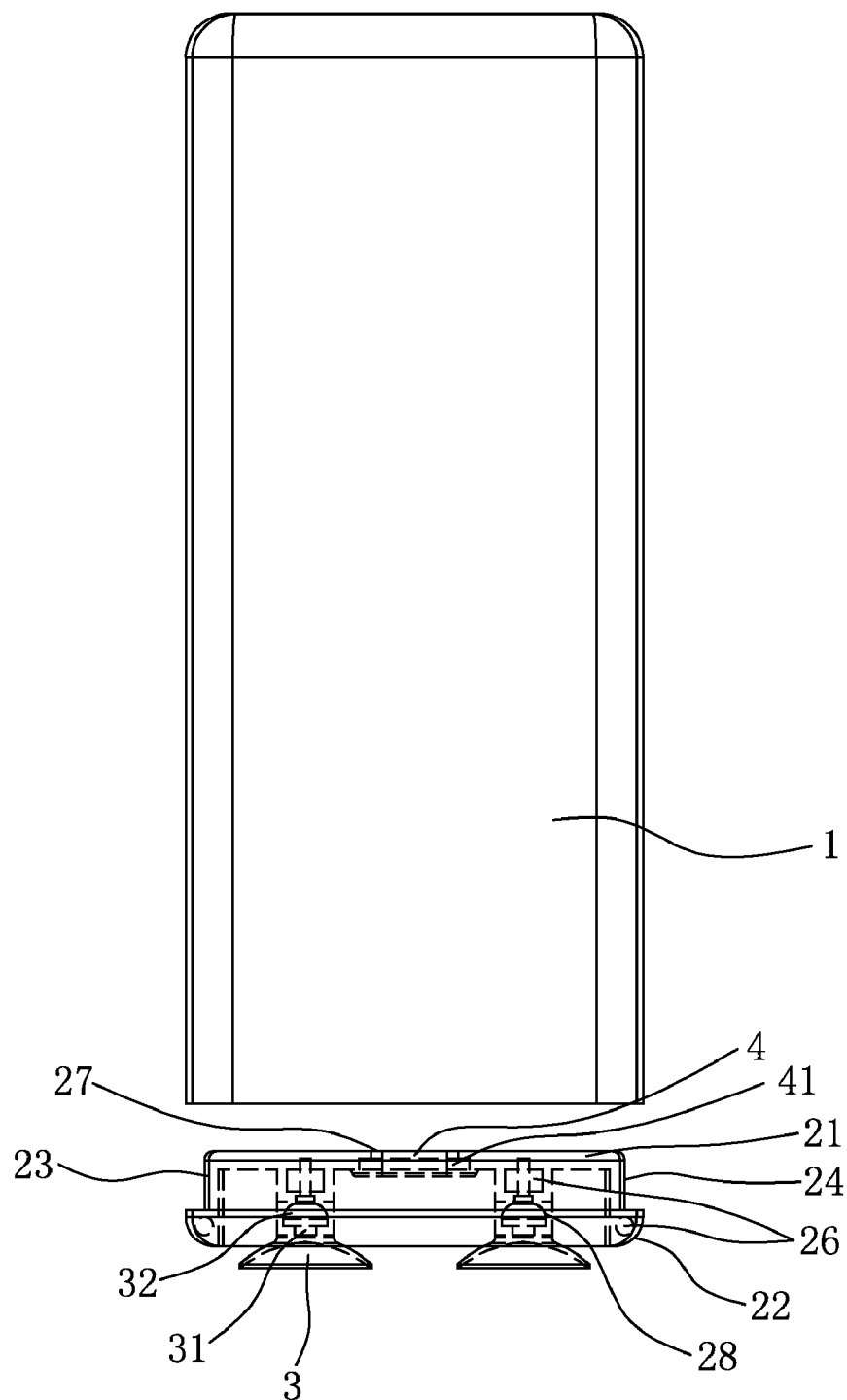
FIG. 9 is a side view of the glasses box of the present invention.
Figure 10:
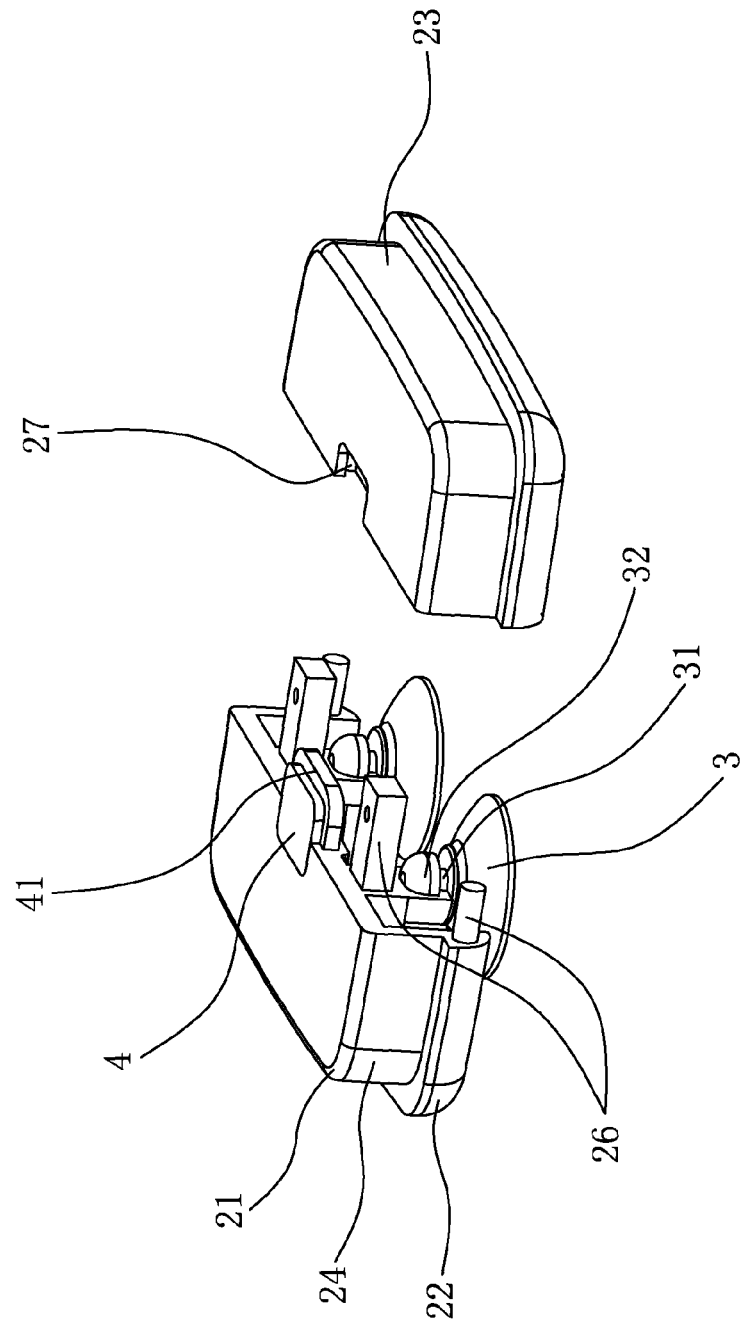
FIG. 10 is a schematic view showing an assembled box cover of the present invention.

The magnet 4 has a locating flange 41. The magnet 4 is placed in the first locating trough 27 with the locating flange 41 engaging with the bottom of the first locating trough 27 so that the magnet 4 is secured on the box cover 2. In this embodiment, the magnet 4 is disposed on the center of the box cover 2. For ensuring the attracting effect of magnetism, the magnet 4 has an end surface flush with the box cover 2, as shown in FIGS. 9 and 10. Alternatively, the end surface of the magnet 4 is higher than the box cover 2.

To assemble the present invention, the sucker 3 is placed in the second locating trough 28 of the left semi-cover 23 (or the right semi-cover 24) and the magnet 4 is placed in the first locating trough 27 of the left semi-cover 23 (or the right semi-cover 24), and then the left semi-cover 23 and the right semi-cover 24 are coupled together. The sucker 3 and the magnet 4 are secured on the outer and inner sides of the box cover 2, respectively. Finally, the box cover 2 is coupled to the box body 1 to form a magnetic glasses box.

When in use, the box body 1 and the box cover 2 provide an accommodating space for receiving glasses therein. When taking out the glasses, the sucker 3 of the box cover 2 is secured on a desired place. The glasses when not in use could be attracted on the magnet 4. This is very convenient for specific glasses which have temples made of metallic material or magnetic members like the glasses as shown in FIGS. 3 and 4.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. Glasses, comprising
a pair of plastic temples, and
a frame which is integrally formed with the temples, wherein an inner side of the junction of each of the temples and the frame being formed with a corrugated surface, and the temples being provided with magnetic members in relative positions for engaging with each other to secure the temples in place when the temples are folded, and being respectively formed with a cavity corresponding in position to each other for receiving one of the magnetic members therein.

2. The glasses as claimed in claim 1, wherein the magnetic members are a magnet and a metallic member, with one of the temples being provided with the magnet and the other of the temples being provided with the metallic member corresponding in position to the magnet, and the magnet and the metallic member engaging with each other to secure the temples in place when the temples are folded.

3. The glasses as claimed in claim 1, wherein the magnetic members are magnets mounted correspondingly in the temples in relative positions for engaging with each other to secure the temples in place when the temples are folded.

4. The glasses as claimed in claim 1, wherein the glasses are made of resin material and the magnetic members are wrapped in the temples.

5. The glasses as claimed in claim 1, wherein the glasses are made of metallic material.

\* \* \* \* \*